United States Patent
Huang et al.

(10) Patent No.: US 7,286,721 B2
(45) Date of Patent: Oct. 23, 2007

(54) FAST EDGE-ORIENTED IMAGE INTERPOLATION ALGORITHM

(75) Inventors: Chin-Hui Huang, Dayuan Township, Taoyuan County (TW); Mei-Juan Chen, Hualien (TW)

(73) Assignee: Leadtek Research Inc., Taipei Hsien (TW)

( * ) Notice: Subject to any disclaimer, the term of this patent is extended or adjusted under 35 U.S.C. 154(b) by 804 days.

(21) Appl. No.: 10/660,089

(22) Filed: Sep. 11, 2003

(65) Prior Publication Data

US 2005/0058371 A1    Mar. 17, 2005

(51) Int. Cl.
*C06K 9/32* (2006.01)

(52) U.S. Cl. ............... 382/299; 382/266; 382/282; 382/300; 358/1.2; 358/3.27; 358/525

(58) Field of Classification Search ......... 382/266, 382/275, 299, 300, 269, 282, 298; 358/1.2, 358/3.26, 3.27, 525
See application file for complete search history.

(56) References Cited

U.S. PATENT DOCUMENTS

| 5,235,432 | A | * | 8/1993 | Creedon et al. | 358/479 |
|---|---|---|---|---|---|
| 5,847,847 | A | * | 12/1998 | Kosaka | 358/508 |
| 5,940,123 | A | * | 8/1999 | Daigle et al. | 348/163 |
| 5,991,464 | A | * | 11/1999 | Hsu et al. | 382/300 |
| 6,097,842 | A | * | 8/2000 | Suzuki et al. | 382/232 |
| 6,400,413 | B1 | * | 6/2002 | Miyake | 348/581 |
| 6,633,683 | B1 | * | 10/2003 | Dinh et al. | 382/260 |
| 6,714,688 | B1 | * | 3/2004 | Gallagher et al. | 382/266 |
| 6,744,916 | B1 | * | 6/2004 | Takahashi | 382/162 |
| 6,771,835 | B2 | * | 8/2004 | Han et al. | 382/260 |
| 7,227,573 | B2 | * | 6/2007 | Stavely | 348/240.2 |

\* cited by examiner

*Primary Examiner*—Yosef Kassa
(74) *Attorney, Agent, or Firm*—J.C. Patents

(57) ABSTRACT

The invention provides an image interpolating method, which comprises receiving the low resolution pixels $Y_{ij}$. Then, a homogenous area and an edge area of the image are determined according to pixel differences of the pixels $Y_{2i,2j}$ in comparing with a threshold. Then, the pixels $Y_{2i,2j}$ belonging to the homogenous area are interpolated by a first interpolating algorithm, while the pixels $Y_{2i,2j}$ belonging to the edge area are interpolated by a second interpolating algorithm.

12 Claims, 9 Drawing Sheets

(a) Horizontal (b) Vertical (c) Diagonal (a) Case 1    (b) Case 2    (c) Case 3

● Original pixel
◉ Interpolated pixel
◉ Interpolated pixel / Edge pixels
○ Edge pixel (a) Original  (b) Zero-order  (c) Bilinear (d) Bicubic  (e) NEDI  (f) Proposed (a) Original    (b) Zero-order    (c) Bilinear (d) Bicubic    (e) NEDI    (f) Proposed

FAST EDGE-ORIENTED IMAGE INTERPOLATION ALGORITHM

BACKGROUND OF THE INVENTION

1. Field of Invention

The present invention relates to image scaling. More particularly, the present invention relates to image interpolating method to zoom a digital image.

2. Description of Related Art

Multimedia communication is becoming important in modem networks. Human can talk face to face and exchange the information each other by Internet and wireless communication. However, the digital image and video sequence have larger size of data, and network bandwidth is limited, thus the quality of multimedia communication decreases. If the low-resolution video sequences are coded in the encoder, and the low-resolution video sequences are enlarged to high-resolution ones using interpolation techniques in the decoder, the bandwidth will be saved.

Briefly, the image interpolation is about image enlargement. Some common interpolation algorithms are proposed, which include zero-order interpolation, linear interpolation and cubic convolution interpolation, . . . etc. To solve artifact effects, many algorithms are proposed, which interpolate images using pixels feature. However, the methods of determining pixel feature need higher computational complexity, and do not achieve real-time (30 frames/sec) image enlargement in video sequence.

To solve artifact effects for image interpolation, many algorithms are proposed. The algorithm can be based on spatial domain direction. The interpolated values along various directions are combined using directional weights, which depend on the variation in the direction. The algorithms also include convolution-based, wherein the interpolated pixels are classified to two decimations. The different decimations are interpolated using different filters, respectively. Also, a hybrid of convolution and median-based is conventionally used by splitting the interpolation into two directional stages.

Also and, a NEDI (new edge-directed interpolation) algorithm is a good algorithm, which produces better subjective quality for image enlargement. The basic idea in NEDI algorithm is first to estimate local covariance coefficient from a low-resolution image and then use these covariance estimates to adapt the interpolation at a higher resolution based on the geometric duality between the low-resolution covariance and the high-resolution covariance. The covariance-based interpolation algorithm has higher computational complexity.

The high-resolution covariance is estimated from its low-resolution counterpart based on their intrinsic "geometric duality". Geometric duality refers to the correspondence between the high-resolution covariance and low-resolution covariance that couple the pair of pixels at the different resolutions but along the same orientation. FIG. 1 shows the geometric duality between the high-resolution covariance $R_{kl}$, $r_k$ and the low-resolution covariance $\hat{R}_{kl}$, $\hat{r}_k$ when interpolating the interlacing lattice $Y_{2i+1,2j+1}$ form $Y_{2i,2j}$. Geometric duality facilitates the estimation of local covariance for 2-D signals without the necessity of explicitly estimating the edge orientation. Similar geometric duality can also be observed in FIG. 2 when interpolating the interlacing lattice $Y_{ij}$(i+j=odd) from the lattice $Y_{ij}$(i+j=even). In fact, FIG. 1 and FIG. 2 are isomorphic up to a scaling factor of $2^{1/2}$ and a rotation factor of $\pi/4$.

The low-resolution covariance $\hat{R}_{kl}$, $\hat{r}_k$ can be easily estimated from a local window of the low-resolution image using the classical covariance method $$\hat{R} = \frac{1}{M^2} C^T C, \hat{r} = \frac{1}{M^2} C^T \vec{y} \tag{1}$$

where $\vec{y} = [y_1 \ldots y_k \ldots y_{M^2}]^2$ is the data vector containing the M×M pixels inside the local window and C is a 4×M² data matrix whose k-th column vector is the four nearest neighbors of $y_k$ along the diagonal direction. The interpolated value of $y_{2i+1,2j+1}$ can be obtained in the following $$Y_{2i+1,2j+1} = \sum_{k=0}^{1} \sum_{l=0}^{1} \alpha_{2k+l} Y_{2(i+k),2(j+l)} \tag{2}$$

According to classical Wiener filtering theory, the optimal minimum mean squared error (MMSE) linear interpolation coefficients are given by $$\vec{\alpha} = R^{-1} \vec{r} \tag{3}$$

According to (1) and (3), $\vec{\alpha}$ is obtained in the following.

$$\vec{\alpha} = (C^T C)^{-1} (C^T \vec{y}) \tag{4}$$

The NEDI algorithm can be used to magnify the size of a grayscale image by any factor that is a power of two along each dimension. In the basic case where the magnification factor is just two, the resizing scheme consists of two steps: the first step is to interpolate the interlacing lattice $Y_{2i+1,2j+1}$ from the lattice $Y_{2i,2j}$; and the second step is to interpolate the other interlacing lattice $Y_{ij}$(i+j=odd) from the lattice $Y_{ij}$(i+j=even).

Even though many interpolation algorithms have been proposed, the current interpolation algorithms still consume a lot of computation time to zoom an image up. A fast interpolating algorithm is still under developing.

SUMMARY OF THE INVENTION

The invention provides an image interpolating method for zooming the low resolution pixels $Y_{ij}$ of an image into the high resolution pixels $Y_{2i,2j}$. The edge-orient is considered, so that the interpolation can be faster and image quality can remain at an acceptable level.

The invention provides an image interpolating method, which comprises receiving the low resolution pixels $Y_{ij}$. Then, a homogenous area and an edge area of the image are determined according to pixel differences of the pixels $Y_{2i,2j}$ in comparing with a threshold. Then, the pixels $Y_{2i,2j}$ belonging to the homogenous area are interpolated by a first interpolating algorithm, while the pixels $Y_{2i,2j}$ belonging to the edge area are interpolated by a second interpolating algorithm.

In the foregoing interpolating method, the step of determining the homogeneous area and the edge area of the image uses three variables of $$\Delta Y_1 = |Y_{2i,2j} - Y_{2i+2p,2j+2q}|, p,q \in \{(0,1),(1,0)\},$$

$$\Delta Y_2 = |Y_{2i+2,2j} - Y_{2i,2j+2}|, \text{ and}$$

$$\Delta Y_3 = |Y_{2i,2j} - Y_{2i+2,2j+2}|$$

to determine whether the homogenous area or the edge area by a condition set of:

if $\Delta Y_1 <$ the threshold then
the pixel $Y_{2i+p,2j+q}$ is in the homogenous area
else
the pixel $Y_{2i+p,2j+q}$ is in the edge area as one of edge pixels;

if $\Delta Y_2 <$ the threshold and $\Delta Y_3 <$ the threshold then
the pixel $Y_{2i+1,2j+1}$ is in the homogenous area
else if $\Delta Y_2 <$ the threshold then
the pixel $Y_{2i+1,2j+1}$ is in the homogenous area
else if $\Delta Y_3 <$ the threshold then
the pixel $Y_{2i+1,2j+1}$ is in the homogenous area else
the pixel $Y_{2i+1,2j+1}$ is in the edge area as one of edge pixels.

In the foregoing interpolating method, the second interpolating algorithm can include interpolating the pixels $Y_{2i,2j}$ along a direction having a minimum difference in the neighboring pixels.

In the foregoing image interpolating method, the neighboring pixels of one of the pixels $Y_{2i,2j}$ does not include the determined edge pixel.

In the foregoing image interpolating method, when the minimum difference $\text{diff}_{min}$ is determined by taking a minimum of four differences of $$\text{diff}_1 = |Y_{2i-1,2j} - Y_{2i+1,2j}|,$$

$$\text{diff}_2 = |Y_{2i-1,2j-1} - Y_{2i+1,2j+1}|,$$

$$\text{diff}_3 = |Y_{2i,2j-1} - Y_{2i,2j+1}|, \text{ and}$$

$$\text{diff}_4 = |Y_{2i+1,2j-1} - Y_{2i-1,2j+1}|,$$

wherein the differences including one of the edge pixels is skipped.

In the foregoing image interpolating method, the pixel $Y_{ij}$ is obtained by calculating $(Y_{2i-1,2j} + Y_{2i+1,2j})/2$ at a direction with the minimum pixel difference.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

As previously mentioned, there are many conventional image interpolation algorithms having been proposed. However, the conventional method at least causes a calculation load. To solve the problem, a novel interpolation algorithm for image enlargement is introduced in the invention. The algorithm provides better subjective quality and lower computational complexity for image enlargement.

To design the new algorithm, at least two goals, which are lower computational complexity and better subjective quality, have been considered. The novel interpolation algorithm of the invention can be at least applied, for example, to video sequences and videoconference efficiently. However, a still image can also be enlarged by the image interpolation algorithm of the invention.

The image interpolation method to interpolate image preferably bases on analyzing the local structure. The original images are segmented dynamically into two areas: homogenous area and edge area. The interpolated pixels in the different areas correspond to different interpolation algorithms, respectively.

Figure 1:
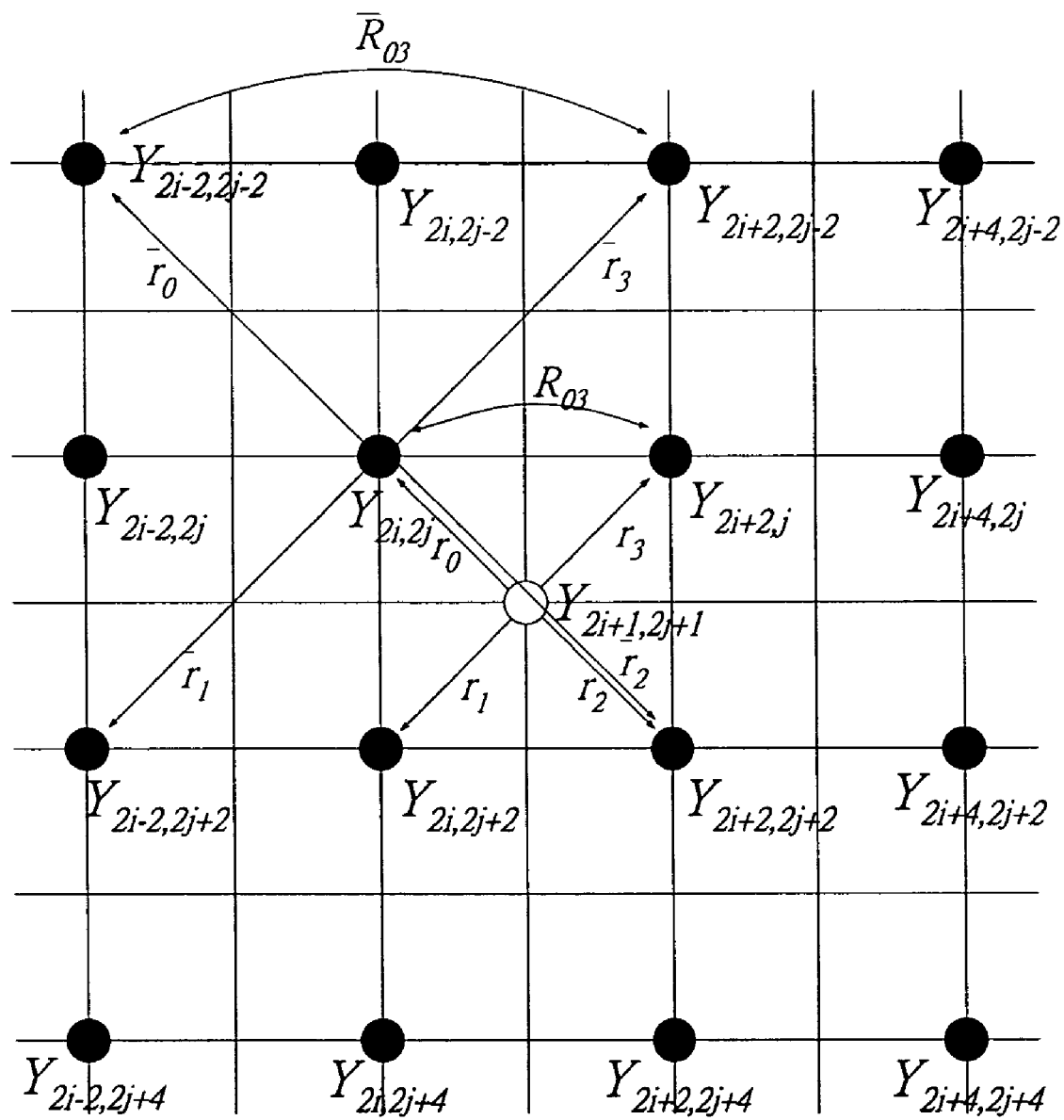
FIG. 1 is a drawing, showing the geometric duality between the high-resolution covariance $R_{kl}$, $r_k$ and the low-resolution covariance $\hat{R}_{kl}$, $\hat{r}_k$ when interpolating the interlacing lattice $Y_{2i+1,2j+1}$ form $Y_{2i,2j}$.
Figure 2:
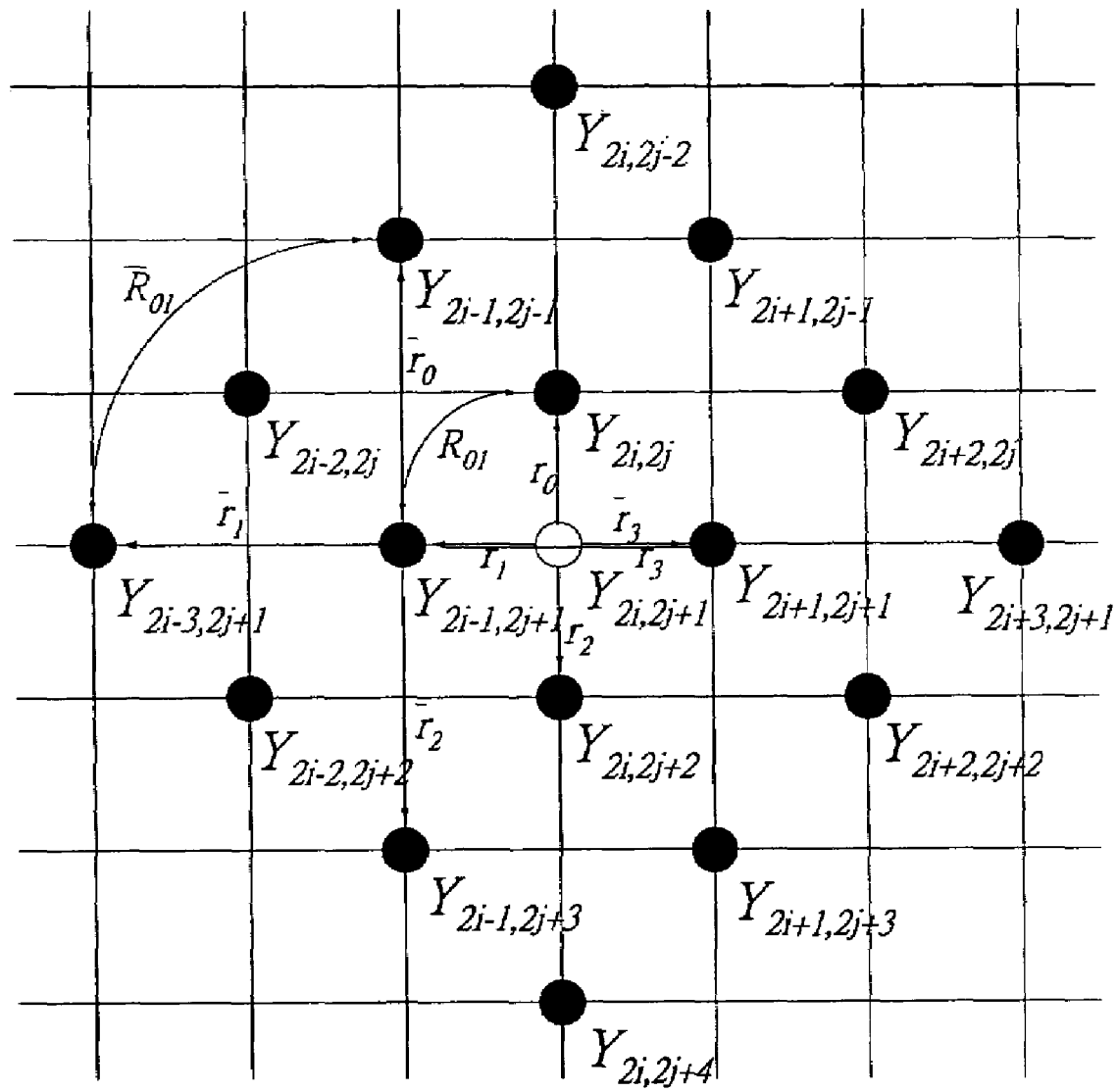
FIG. 2 is a drawing, showing a similar geometric duality when interpolating the interlacing lattice $Y_{ij}$ (i+j=odd) from the lattice $Y_{ij}$ (i+j=even).
Figure 3:
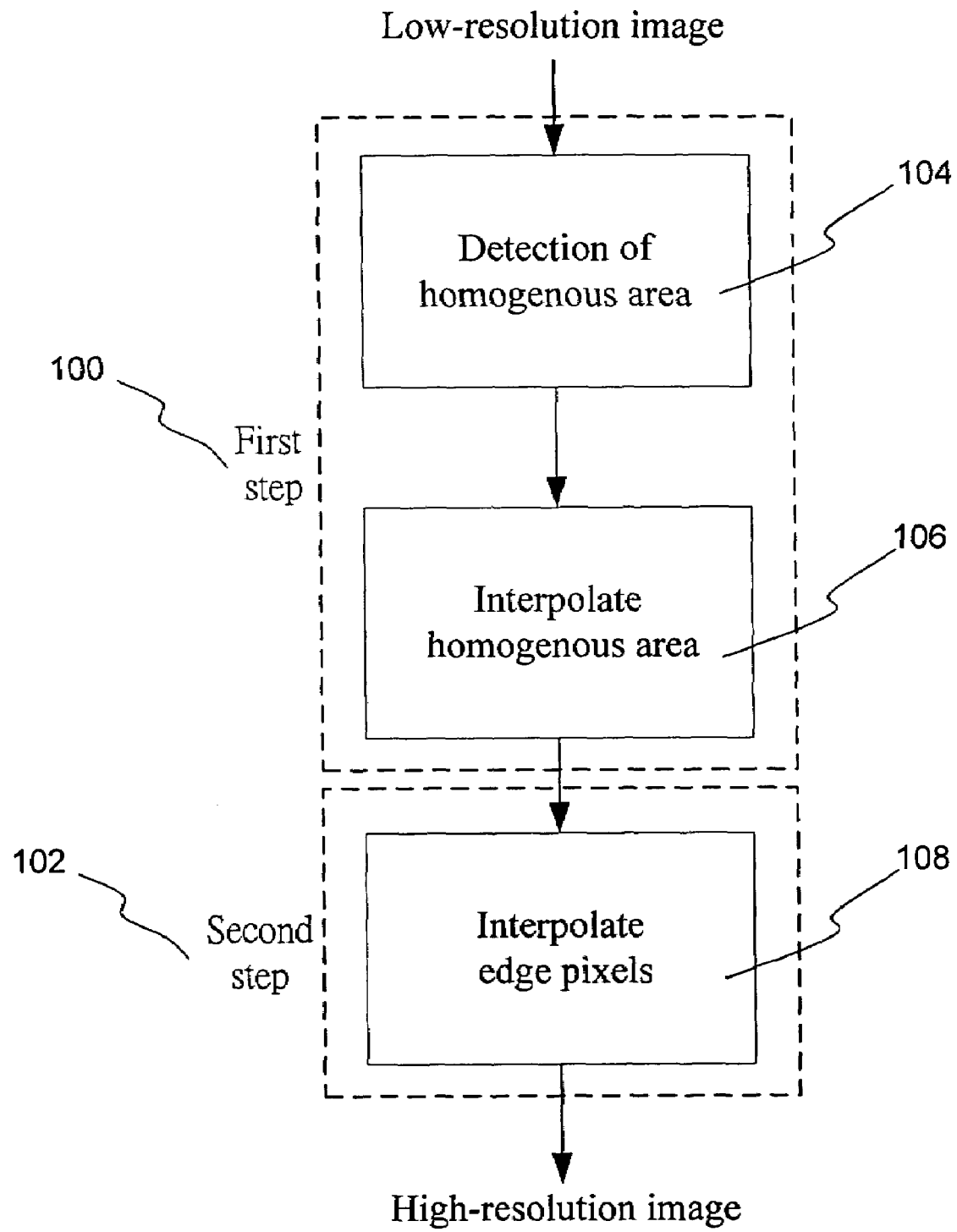
FIG. 3 is a flow diagram, schematically illustrating the process of the image interpolating method, according to a preferred embodiment of the invention.
Figure 4:
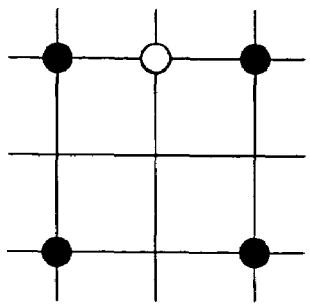
FIG. 4 is a drawing, schematically illustrating the pixel difference in three directions, according to a preferred embodiment of the invention.
Figure 4:
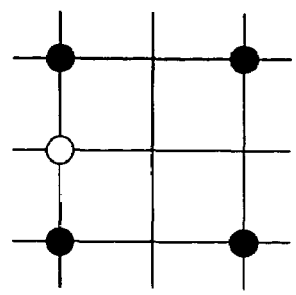
Figure 4:
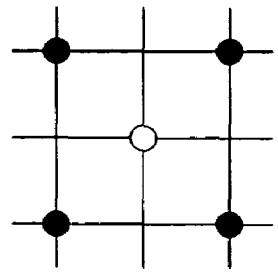

In the algorithm of the invention, the interpolated pixels are determined to belong to homogenous area or edge area using a threshold value. The threshold value for example is 10% of the full displaying range of the pixel value. For example, the full displaying range of gray level images are from 0 to 255, and the threshold is 25. The algorithm of the invention includes two steps 100 and 102, as shown in FIG. 3. In step 104 of the first step 100, a definition is made for the differences on the horizontal, vertical and diagonal directions, respectively, in the 3×3 window. Referring to FIG. 4, the differences on three directions one by one are determined. If the pixel difference is less than the threshold value, the pixel belongs to a homogenous area, wherein the homogenous pixel is interpolated using, for example, bilinear interpolation algorithm (step 106). If the pixel difference is bigger than the threshold value, it belongs to an edge area. After the first step 100, some remaining non-interpolated pixels then belong to the edge area. Second, the edge pixels are interpolated by the proposed algorithm of the invention, which interpolates edge pixels using neighboring pixels information. The neighboring pixels contain original pixels and interpolated pixels in the first step 100.

Figure 5:
FIG. 5 is a drawing, schematically illustrating the result of an image Lena after the first step of the interpolating algorithm, according to a preferred embodiment of the invention.

FIG. 5 shows the result of first step 100 of the invention for Lena image. Some non-interpolated pixels exist at the image edge. In the second step 102 of the invention, the edge pixels are interpolated using all neighboring pixels, which contain original pixels and interpolated pixels at first step.

Figure 6:
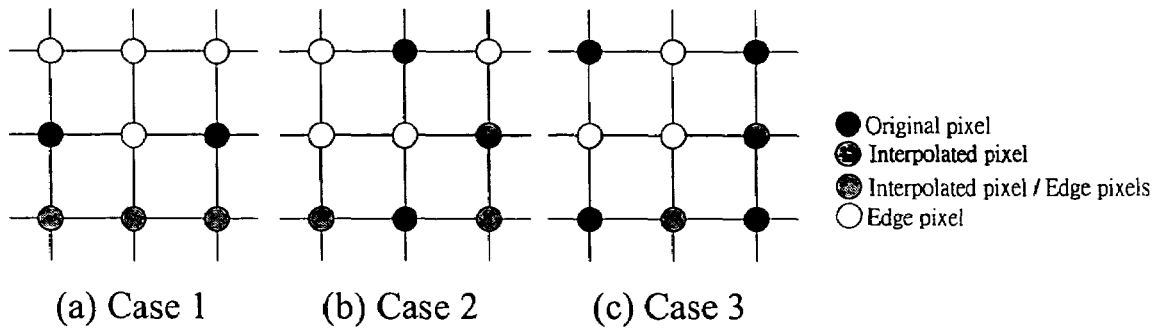
FIG. 6 is a drawing, schematically illustrating the neighboring pixels.

As shown in FIG. 6, the neighboring pixels contain black-points, gray-points and spot-points. We know the smallest pixel difference imply the greatest relation between the pixels. Furthermore, the edge pixel is interpolated along the direction of the minimum difference. If all of the spot-points belong to interpolated pixels at the first step 100, the minimum difference is found on four directions through the white-point (edge pixel). If any spot-points belong to edge pixels, the minimum difference is found on the other directions excluding the edge pixels. In the following, the proposed algorithm is described in detail.

Figure 7:
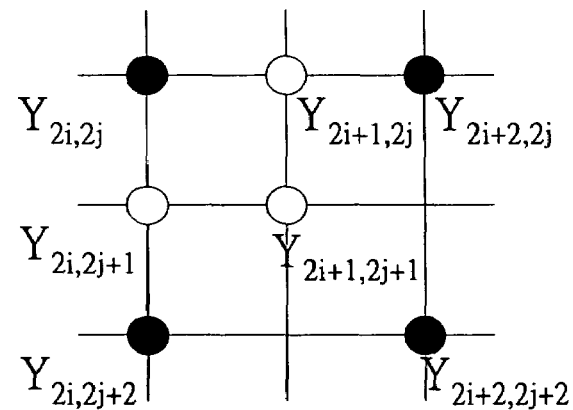
FIG. 7 is a drawing, schematically illustrating the interpolation of the homogenous pixels.

Referring to FIG. 7, it is assumed that the X of low-resolution image with size H×W is enlarged to the Y of high-resolution image with size 2H×2W. The $Y_{2i,2j}$ is zoomed from $X_{ij}$ and it is determines about the homogenous pixels at $Y_{2i+1,2j}$, $Y_{2i,2j+1}$ and $Y_{2i+1,2j+1}$ using pixel difference criterion. If these pixels homogenous pixels, it is interpolated for these pixels using, for example, bilinear interpolation algorithm. The pixel difference criterion is described as following:

$$\Delta Y_1 = |Y_{2i,2j} - Y_{2i+2p,2j+2q}|$$

$$\Delta Y_2 = |Y_{2i+2,2j} - Y_{2i,2j+2}|$$

$$\Delta Y_3 = |Y_{2i,2j} - Y_{2i+2,2j+2}|$$

if $\Delta Y_1$<threshold then $$Y_{2i+p,2j+q} = (Y_{2i,2j} + Y_{2i+2p,2j+2q})/2 \quad (5)$$

else $$Y_{2i+p,2j+q} \text{ are edge pixel} \quad (6)$$

where $p,q \in \{(0,1),(1,0)\}$ if $\Delta Y_2$<threshold and $\Delta Y_3$<threshold then $\Delta Y_{min} = \min\{\Delta Y_2, \Delta Y_3\}$ if $\Delta Y_{min} = \Delta Y_2$ $$Y_{2i+1,2j+1} = (Y_{2i+2,2j} + Y_{2i,2j+2})/2 \quad (7)$$

else $$Y_{2i+1,2j+1} = (Y_{2i,2j} + Y_{2i+2,2j+2})/2 \quad (8)$$

else if $\Delta Y_2$<threshold then $$Y_{2i+1,2j+1} = (Y_{2i+2,2j} + Y_{2i,2j+2})/2 \quad (9)$$

else if $\Delta Y_3$<threshold then $$Y_{2i+1,2j+1} = (Y_{2i,2j} + Y_{2i+2,2j+2})/2 \quad (10)$$

else $Y_{2i+1,2j+1}$ is edge pixel. (11)

The edge pixels are the non-interpolated pixels after the decision of pixel difference criterion and processed by following procedure.

An Edge-Oriented Adaptive Interpolation for the edge pixels of the invention is described as an example.

Figure 8:
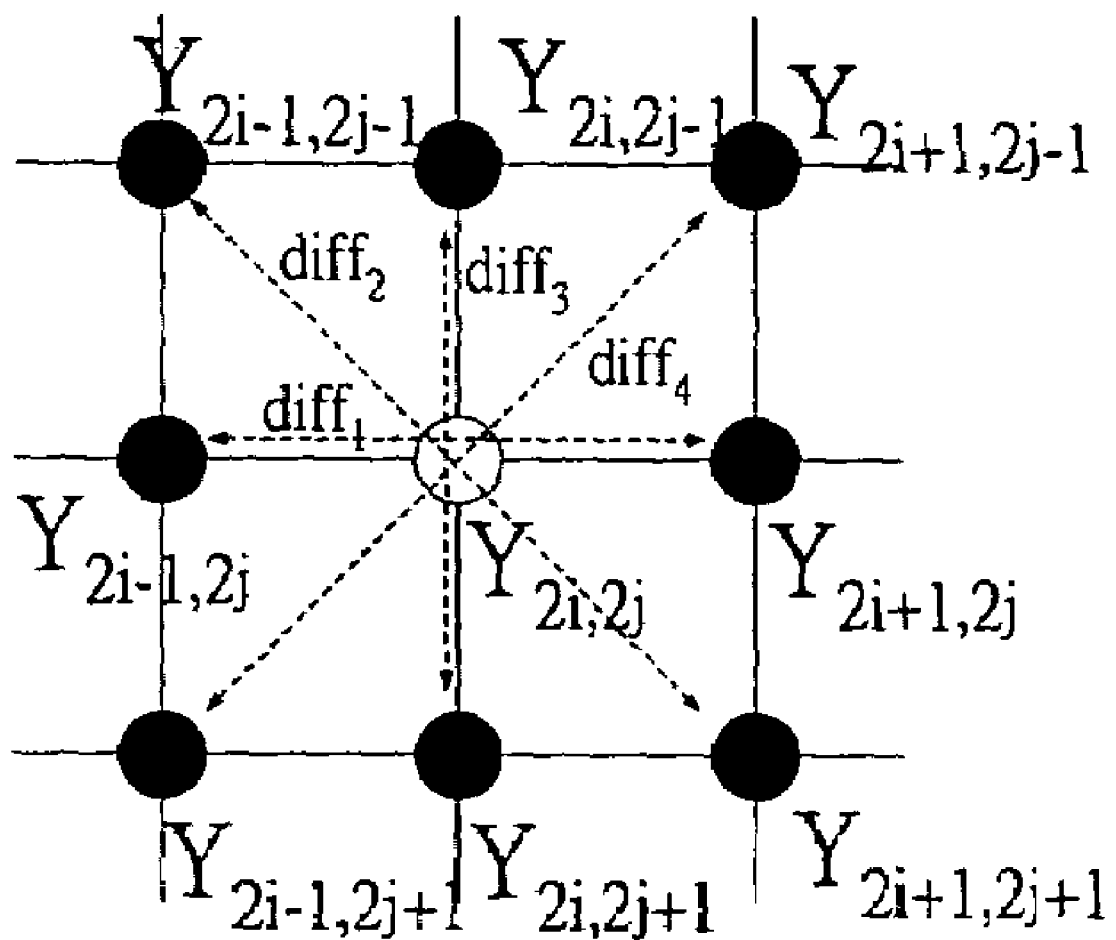
FIG. 8 is a drawing, schematically illustrating the interpolation of the edge pixels.

To find the minimum difference, two cases are described in the following. Case 1, all of the neighboring pixels are already interpolated at first step. The algorithm interpolates the edge pixels by the neighboring pixels of four directions. The minimum difference among four directions is evaluated first. The direction of the minimum difference represents that the edge pixel is oriented to this direction as shown in FIG. 8. The procedure of the minimum difference algorithm is shown as following:

$$\text{diff}_1 = |Y_{2i-1,2j} - Y_{2i+1,2j}|$$

$$\text{diff}_2 = |Y_{2i-1,2j-1} - Y_{2i+1,2j+1}|$$

$$\text{diff}_3 = |Y_{2i,2j-1} - Y_{2i,2j+1}|$$

$$\text{diff}_4 = |Y_{2i+1,2j-1} - Y_{2i-1,2j+1}|$$

$$\text{diff}_{min} = \min\{\text{diff}_k\}, \text{ for } k=1\text{-}4 \quad (12)$$

In case 2, some of neighboring pixels are not interpolated at first step. In other words, some of neighboring pixels belong to the edge pixels, too. The minimum difference is found by using remaining neighboring pixels. The case 2 is explained in the following. Referring to FIG. 8, it is assumed that two pixels $Y_{2i-1,2j+1}$ and $Y_{2i,2j+1}$ are not interpolated at first step as an example, then the minimum difference is found by skipping these two directions. The procedure shows in the following.

$$\text{diff}_1 = |Y_{2i-1,2j} - Y_{2i+1,2j}|$$

$$\text{diff}_2 = |Y_{2i-1,2j-1} - Y_{2i+1,2j+1}|$$

$$\text{diff}_{min} = \min\{\text{diff}_k\}, \text{ for } k=1\text{-}2 \quad (13)$$

From the above cases, we can find the orientation of the $\text{diff}_{min}$. For example, if the $\text{diff}_{min}$ is found as $\text{diff}_1$, $Y_{2i-1,2j}$ correlates closely with $Y_{2i+1,2j}$, and $Y_{2i,2j}$ is interpolated using (14).

$$Y_{2i,2j} = (Y_{2i-1,2j} + Y_{2i+1,2j})/2 \quad (14)$$

Experiments are performed to verify the image interpolating method of the invention. It has been tested for comparing subjective and objective qualities of Zero-order, Bilinear, Bicubic, NEDI and proposed algorithms. Six gray-level images, Pepper, Milkdrop, Tiffany, Comtal, Jet, Lena and three color images, Pepper, Jet, Lena are tested. Our goals are real-time interpolation and better subjective quality. The experiment results are shown in the following.

Zero-order, bilinear and bicubic are well-known linear interpolation methods, and the PSNR and computational complexity of these algorithms are compared and shown in Table 1 and Table 4, respectively. Then, the interpolation algorithm of homogenous area is decided according to the above results. The PSNR of bilinear and bicubic interpolation algorithms are similar, but the bicubic interpolation algorithm has greater computational complexity than bilinear interpolation algorithm. So, the bilinear interpolation algorithm is used in the first step of our proposed algorithm.

TABLE 1

Average PSNR values of the homogenous area using different algorithms for six images

|  | Zero-order (dB) | Bilinear (dB) | Bicubic (dB) |
| --- | --- | --- | --- |
| PSNR | 26.61 | 29.96 | 30.05 |

Figure 9:
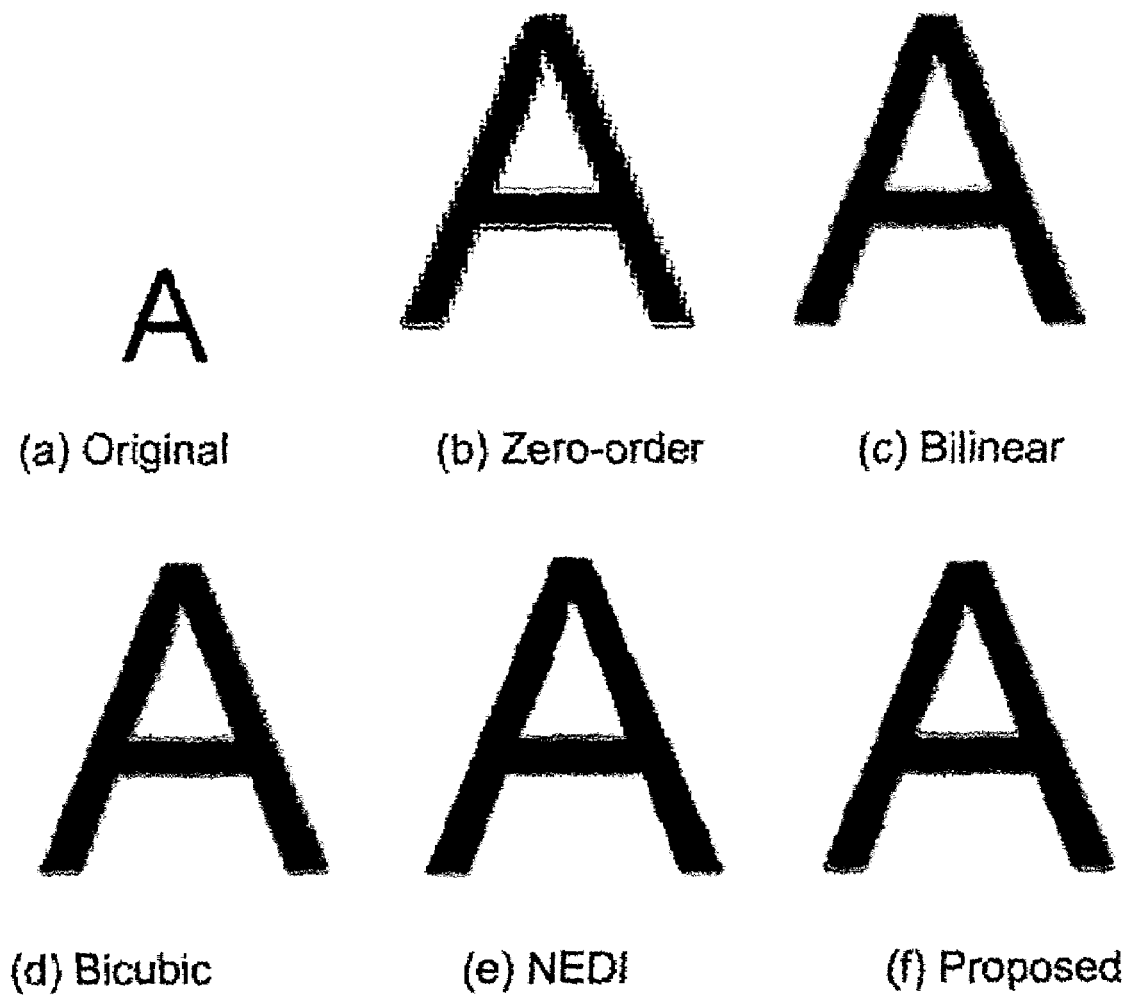
FIG. 9 is a drawing, schematically illustrating the interpolation results by various algorithms for artificial image A.
Figure 10:
FIG. 10 is a drawing, schematically illustrating a subjective quality of the portion of Lena image.
Figure 10:
Figure 10:
Figure 10:
Figure 10:
Figure 11:
FIG. 11 is a drawing, schematically illustrating a subjective quality of the portion of Pepper image.
Figure 11:
Figure 11:
Figure 11:
Figure 11:

FIG. 9 shows the subjective quality for step edge test. In FIG. 9, the simple image is interpolated, and the result of NEDI algorithm has better performance than zero-order, bilinear and bicubic algorithms. The result of our proposed algorithm is similar to the NEDI algorithm. FIG. 10 and FIG. 11 show subjective qualities for the portions of Lena and Pepper images. In FIG. 10 and FIG. 11, the image edge is concerned, and the interpolated images have smoother on edge. Also and, the shoulders and the brim of a hat in FIG. 10 are observed, and pepper in FIG. 11 is observed. Table 2 shows the objective quality of gray-level images for up sample from 256×256 to 512×512 and from 128×128 to 512×512, and Table 3 shows the objective quality of color images for up sample from 256×256 to 512×512 and 128×128 to 512×512. The proposed algorithm of the invention has better objective quality in the most of gray-level images. According to the above results, it is found that the NEDI algorithm has worse objective quality but has better subjective quality. The NEDI algorithm hides the distortion in homogenous area, and human eyes are not sensitive for homogenous area. So, our proposed algorithm has better objective quality than NEDI algorithm, and has similar subjective quality to NEDI algorithm.

lation and the subjective quality similar to edge direction interpolation. So, the proposed algorithm can be applied to videoconference, which transforms QCIF to CIF size or transforms CIF to 4CIF size. And, the quality of videoconference will be promoted.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

TABLE 2

PSNR (dB) comparison for gray level images

| | 256 × 256 to 512 × 512 | | | | | | 128 × 128 to 512 × 512 | | | | | |
|---|---|---|---|---|---|---|---|---|---|---|---|---|
| | Pepper | Milk-drop | Tiffany | Comtal | Jet | Lena | Pepper | Milk-drop | Tiffany | Comtal | Jet | Lena |
| Zero-order | 27.53 | 29.85 | 27.87 | 25.39 | 26.61 | 29.01 | 24.39 | 26.36 | 26.12 | 22.01 | 23.47 | 25.87 |
| Bilinear | 32.19 | 34.18 | 29.90 | 29.60 | 30.79 | 34.17 | 27.52 | 29.60 | 27.77 | 24.58 | 25.91 | 28.67 |
| Bicubic | 32.27 | 34.31 | 29.86 | 29.73 | 31.19 | 34.68 | 27.50 | 29.66 | 27.61 | 24.50 | 25.97 | 28.75 |
| NEDI | 28.54 | 29.20 | 28.58 | 27.06 | 28.97 | 30.10 | 23.94 | 24.94 | 24.86 | 22.21 | 23.62 | 24.98 |
| Proposed | 33.35 | 35.34 | 29.99 | 29.95 | 30.77 | 33.95 | 28.96 | 31.16 | 27.90 | 24.77 | 25.99 | 28.56 |

TABLE 3

PSNR (dB) comparison for color images

| | 256 × 256 to 512 × 512 | | | 128 × 128 to 512 × 512 | | |
|---|---|---|---|---|---|---|
| | Pepper | Jet | Lena | Pepper | Jet | Lena |
| Zero-order | 26.14 | 25.93 | 28.04 | 23.34 | 23.19 | 25.14 |
| Bilinear | 30.01 | 29.35 | 32.57 | 26.25 | 25.37 | 27.77 |
| Bicubic | 29.95 | 29.62 | 32.86 | 26.14 | 25.38 | 27.78 |
| NEDI | 27.06 | 27.41 | 29.11 | 23.17 | 23.00 | 24.46 |
| Proposed | 30.84 | 29.45 | 32.32 | 27.47 | 25.49 | 27.64 |

TABLE 4

Comparison of computational complexity (Assume n pixels are interpolated)

| | | Add | Sub | Mul. | Div. | Shift | Inverse |
|---|---|---|---|---|---|---|---|
| Zero-order | | — | — | — | — | — | — |
| Bilinear | | 3n | 3n | 6n | — | — | — |
| Bicubic | | 27n | 45n | 135n | 9n | — | — |
| NEDI | Homogenous | n | — | — | — | n | — |
| | Edge | 4n | — | 1288n | — | — | 4n |
| Proposed | Homogenous | n | — | — | — | n | — |
| | Edge | n | 4n | — | — | n | — |

The computational complexity of each algorithm is shown in Table 4. According to Table 4, the NEDI algorithm has the highest computational complexity on edge area. And, our proposed algorithm has lower computational complexity than most of other algorithms.

In conclusions, the proposed algorithm at least successfully achieves two goals, which can have real-time interpo-

What is claimed is:

1. An image interpolating method, wherein low resolution pixels $Y_{ij}$ of an image are zoomed to high resolution pixels $Y_{2i,2j}$, comprising:
   receiving the low resolution pixels $Y_{ij}$;
   determining a homogenous area and an edge area of the image based on pixel differences of the pixels $Y_{2i,2j}$ in comparing with a threshold, wherein three variables of $\Delta Y_1 = |Y_{2i,2j} - Y_{2i+2p,2j+2q}|$, $p,q \in \{(0,1),(1,0)\}$, $\Delta Y_2 = |Y_{2i+2,2j} - Y_{2i,2j+2}|$, and $\Delta Y_3 = |Y_{2i,2j} - Y_{2i+2,2j+2}|$ are used to determine whether the homogenous area or the edge area by a condition set of:
   if $\Delta Y_1 <$ the threshold then
      the pixel $Y_{2i+p,2j+q}$ is in the homogenous area
   else
      the pixel $Y_{2i+p,2j+q}$ is in the edge area as one of edge pixels;
   if $\Delta Y_2 <$ the threshold and $\Delta Y_3 <$ the threshold then
      the pixel $Y_{2i+1,2j+1}$ is in the homogenous area
   else if $\Delta Y_2 <$ the threshold then
      the pixel $Y_{2i+1,2j+1}$ is in the homogenous area
   else if $\Delta Y_3 <$ the threshold then
      the pixel $Y_{2i+1,2j+1}$ is in the homogenous area
   else
      the pixel $Y_{2i+1,2j+1}$ is in the edge area as one of edge pixels;
   interpolating the low resolution pixels belonging to the homogenous area into the high resolution pixels by a first interpolating algorithm; and
   interpolating the low resolution pixels belonging to the edge area into the high resolution pixels by a second interpolating algorithm.

2. The image interpolating method of claim 1, wherein the first interpolating algorithm includes obtaining the pixel $Y_{2i+p,2j+q}$ by calculating $(Y_{2i,2j}+Y_{2i+2p,2j+2q})/2$.

3. The image interpolating method of claim 1, wherein the first interpolating algorithm includes:
when $\Delta Y_2 <$ the threshold and $\Delta Y_3 <$ the threshold,
the pixel $Y_{2i+1,2j+1}$ is obtained by calculating $Y_{2i+1,2j+1} = (Y_{2i+2,2j}+Y_{2i,2j+2})/2$ if the $\Delta Y_2$ less than $\Delta_3$; and
the pixel $Y_{2i+1,2j+1}$ is obtained by calculating $Y_{2i+1,2j+1} = (Y_{2i+2,2j}+Y_{2i,2j+2})/2$ if the $\Delta Y_3$ is less than $\Delta Y_2$.

4. The image interpolating method of claim 1, wherein the first interpolating algorithm includes:
when only $\Delta Y_2 <$ the threshold for the $\Delta Y_2$ and the $\Delta Y_3$, the pixel $Y_{2i+1,2j+1}$ is obtained by calculating $(Y_{2i+2,2j}+Y_{2i,2j+2})/2$.

5. The image interpolating method of claim 1, wherein the first interpolating algorithm includes:
when only $\Delta Y_3 <$ the threshold for the $\Delta Y_2$ and the $\Delta Y_3$, the pixel $Y_{2i+1,2j+1}$ is obtained by calculating $(Y_{2i,2j}+Y_{2i+2j+2})/2$.

6. The image interpolating method of claim 1, wherein the second interpolating algorithm includes interpolating the pixels $Y_{2i,2j}$ along a direction having a minimum difference in the neighboring pixels.

7. The image interpolating method of claim 6, wherein the neighboring pixels of one of the pixels $Y_{2i,2j}$ does not include a determined edge pixel.

8. The image interpolating method of claim 6, wherein when the minimum difference $\text{diff}_{min}$ is determined by taking a minimum of four differences of $$\text{diff}_1 = |Y_{2i-1,2j} - Y_{2i+1,2j}|,$$

$$\text{diff}_2 = |Y_{2i-1,2j-1} - Y_{2i+1,2j+1}|,$$

$$\text{diff}_3 = |Y_{2i,2j-1} - Y_{2i,2j+1}|, \text{ and}$$

$$\text{diff}_4 = |Y_{2i+1,2j-1} - Y_{2i-1,2j+1}|,$$

wherein the differences including one of the edge pixels is skipped.

9. The image interpolating method of claim 6, wherein the pixel $Y_{ij}$ is obtained by calculating $(Y_{2i-1,2j}+Y_{2i+1,2j})/2$ at a direction with the minimum pixel difference.

10. The image interpolating algorithm of claim 1, further comprising interpolating the edge pixels according to a second algorithm as follows:
calculating a plurality of pixel differences of $$\text{diff}_1 = |Y_{2i-1,2j} - Y_{2i+1,2j}|,$$

$$\text{diff}_2 = |Y_{2i-1,2j-1} - Y_{2i+1,2j+1}|,$$

$$\text{diff}_3 = |Y_{2i,2j-1} - Y_{2i,2j+1}|, \text{ and}$$

$$\text{diff}_4 = |Y_{2i+1,2j-1} - Y_{2i-1,2j+1}|,$$

wherein the differences including one of the edge pixels is skipped;
finding a minimum of the pixel differences; and
interpolating the pixel $Y_{2i,\ 2j} = (Y_{2i-1,2j}+Y_{2i+1,2j})/2$ at a direction with the minimum pixel difference.

11. An image interpolating method, wherein low resolution pixels $Y_{i,j}$ of an image are zoomed to high resolution pixels $Y_{2i,2j}$, the method comprising:
receiving the low resolution pixels $Y_{i,j}$;
determining a homogenous area and an edge area of the image based on pixel differences of the pixels $Y_{2i,2j}$ in comparing with a threshold;
interpolating the low resolution pixels belonging to the homogenous area into the high resolution pixels by a first interpolating algorithm; and
interpolating the low resolution pixels belonging to the edge area into the high resolution pixels by a second interpolating algorithm, wherein the first interpolating algorithm includes:
when the pixels $Y_{2i,2j}$ in the homogenous area, the pixels $Y_{2i,2j}$ are interpolated by a linear interpolation algorithm.

12. An image interpolating algorithm for an image, wherein low resolution pixels $Y_{i,j}$ of the image are zoomed to high resolution pixels $Y_{2i,2j}$, wherein three variables of $\Delta Y_1 = |Y_{2i,2j} - Y_{2i+2p,2j+2q}|$, $\Delta Y_2 = |Y_{2i+2,2j} - Y_{2i,2j+2}|$, and $\Delta Y_3 = |Y_{2i,2j} - Y_{2i+2,2j+2}|$, $p,q \in \{(0,1), (1,0)\}$ are used, the image interpolating algorithm comprising:
determining at least one of edge pixel and interpolating the pixels Y2i, 2j if the pixel to be interpolated is not the edge pixel by a first algorithm as follows:
if $\Delta Y_1 <$ a threshold then $$Y_{2i+p,2j+q} = (Y_{2i,2j}+Y_{2i+2p,2j+2q})/2$$

else $Y_{2i+p,2j+q}$ are the edge pixel
if $\Delta Y_2 <$ the threshold and $\Delta Y_3 <$ the threshold then $$\Delta Y_{min} = \min\{\Delta Y_2, \Delta Y_3\}$$

if $\Delta Y_{min} = \Delta Y_2$ $$Y_{2i+1,2j+1} = (Y_{2i+2,2j}+Y_{2i,2j+2})/2$$

else $$Y_{2i+1,2j+1} = (Y_{2i,2j}+Y_{2i+2,2j+2})/2$$

else if $\Delta Y_2 <$ the threshold then $$Y_{2i+1,2j+1} = (Y_{2i+2,2j}+Y_{2i,2j+2})/2$$

else if $\Delta Y_3 <$ the threshold then $$Y_{2i+1,2j+1} = (Y_{2i,2j}+Y_{2i+2,2j+2})/2$$

else $Y_{2i+1,2j+1}$ is one of the edge pixel.

* * * * *